(12) United States Patent
Cheng et al.

(10) Patent No.: US 12,745,309 B2
(45) Date of Patent: Sep. 22, 2026

(54) STATE TRANSITION IN SIDELINK LAYER 2 RELAY SYSTEMS

(71) Applicant: QUALCOMM Incorporated, San Diego, CA (US)

(72) Inventors: Peng Cheng, Beijing (CN); Karthika Paladugu, San Diego, CA (US); Ozcan Ozturk, San Diego, CA (US); Gavin Bernard Horn, La Jolla, CA (US); Hong Cheng, Basking Ridge, NJ (US)

( * ) Notice: Subject to any disclaimer, the term of this patent is extended or adjusted under 35 U.S.C. 154(b) by 605 days.

(21) Appl. No.: 18/000,631

(22) PCT Filed: Jul. 25, 2020

(86) PCT No.: PCT/CN2020/104672

§ 371 (c)(1),
(2) Date: Dec. 2, 2022

(87) PCT Pub. No.: WO2022/020981

PCT Pub. Date: Feb. 3, 2022

(65) Prior Publication Data

US 2023/0300937 A1 Sep. 21, 2023

(51) Int. Cl.
*H04W 76/27* (2018.01)

(52) U.S. Cl.
CPC .................................... *H04W 76/27* (2018.02)

(58) Field of Classification Search
CPC ..... H04W 76/27; H04W 76/34; H04W 72/25; H04W 72/40; H04W 4/40; H04W 4/44; H04W 4/46; H04W 4/48; H04W 4/42
See application file for complete search history.

(56) References Cited

U.S. PATENT DOCUMENTS 10,602,568 B2 3/2020 Jung et al.
2018/0279188 A1* 9/2018 Tenny ............... H04W 36/0016
2020/0015192 A1 1/2020 Chun
2020/0053823 A1 2/2020 Mildh et al.
2020/0107268 A1 4/2020 Lee et al.
2020/0128466 A1 4/2020 Vutukuri et al.
2020/0221532 A1 7/2020 Jung et al.
2020/0260353 A1* 8/2020 Xu ........................ H04W 76/27
2020/0374969 A1 11/2020 Fujishiro
2021/0051758 A1* 2/2021 Xu ........................ H04W 88/04
2021/0160956 A1* 5/2021 Wang .................... H04W 40/34
2022/0191745 A1* 6/2022 Tenny ............... H04W 36/0009
(Continued)

FOREIGN PATENT DOCUMENTS

CN 102223658 A 10/2011
CN 102972087 A 3/2013
(Continued)

OTHER PUBLICATIONS

3GPP TR 36.746 V15.1.1 (Apr. 2018); (Year: 2018).*
(Continued)

*Primary Examiner* — Mohammed S Chowdhury

(57) ABSTRACT

Certain aspects of the present disclosure provide techniques for paging in sidelink L2 relay scenarios. An example method generally includes receiving, from one of a network entity or a relay UE to which the remote UE is connected, an indication to transition from a connected state to an idle or inactive state; and transitioning into an idle or inactive state in response to receiving the indication.

18 Claims, 22 Drawing Sheets

(56) References Cited

U.S. PATENT DOCUMENTS

| | | | | |
|---|---|---|---|---|
| 2022/0394807 | A1* | 12/2022 | Xu | H04W 76/14 |
| 2023/0093649 | A1* | 3/2023 | Wang | H04W 68/025 455/458 |
| 2023/0113249 | A1* | 4/2023 | Hu | H04W 76/14 370/328 |
| 2023/0180313 | A1* | 6/2023 | Freda | H04W 76/14 370/310 |

FOREIGN PATENT DOCUMENTS

| | | | |
|---|---|---|---|
| CN | 106105320 | A | 11/2016 |
| CN | 109891947 | A | 6/2019 |
| CN | 110521157 | A | 11/2019 |
| KR | 20160138928 | A | 12/2016 |
| KR | 20170134677 | A | 12/2017 |
| KR | 20180033443 | A | 4/2018 |
| WO | 2018201687 | A1 | 11/2018 |

OTHER PUBLICATIONS

3GPP TR 23.733 V15.1.0 (Dec. 2017) (Year: 2017).*

OPPO: "Discussion on RRC state of remote UE", 3GPP TSG-RAN2 Meeting #98, R2-1704044, Hangzhou, China, May 15-19, 2017, 4 Pages.

Supplementary European Search Report—EP20946679—Search Authority—Berlin—May 3, 2024.

International Search Report and Written Opinion—PCT/CN2020/104672—ISA/EPO—Apr. 16, 2021.

* cited by examiner

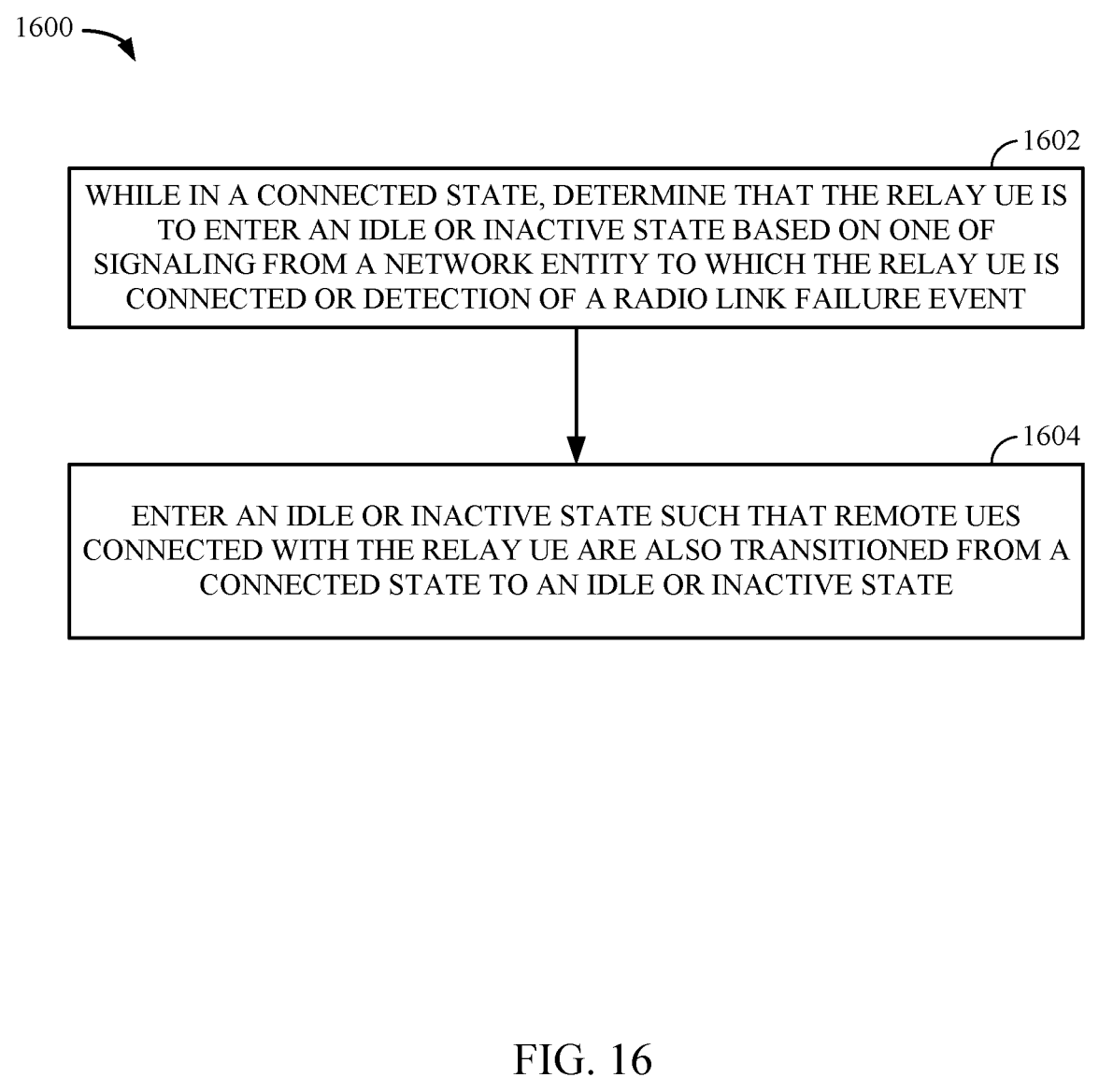

1600

1602

WHILE IN A CONNECTED STATE, DETERMINE THAT THE RELAY UE IS TO ENTER AN IDLE OR INACTIVE STATE BASED ON ONE OF SIGNALING FROM A NETWORK ENTITY TO WHICH THE RELAY UE IS CONNECTED OR DETECTION OF A RADIO LINK FAILURE EVENT

1604

ENTER AN IDLE OR INACTIVE STATE SUCH THAT REMOTE UES CONNECTED WITH THE RELAY UE ARE ALSO TRANSITIONED FROM A CONNECTED STATE TO AN IDLE OR INACTIVE STATE

FIG. 16

| relay / remote | IDLE | INACTIVE | CONNECTED |
| --- | --- | --- | --- |
| IDLE | ✓ | ✓ | ✓ |
| INACTIVE | ✓ | ✓ | ✓ |
| CONNECTED | × | × | ✓ |

FIG. 18

STATE TRANSITION IN SIDELINK LAYER 2 RELAY SYSTEMS

CROSS-REFERENCE TO RELATED APPLICATIONS

This application is a national stage application under 35 U.S.C. 371 of PCT/CN2020/104672, filed Jul. 25, 2020, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for performing state transitions in sidelink layer 2 (L2) relay systems.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications are communications from one UE to another UE. As the demand for mobile broadband access continues to increase, there exists a need for further improvements in NR and LTE technology, including improvements to sidelink communications. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a remote user equipment (UE). The method generally includes receiving, from one of a network entity or a relay UE to which the remote UE is connected, an indication to transition from a connected state to an idle or inactive state; and transition into an idle or inactive state in response to receiving the indication.

Certain aspects provide a method for wireless communication by a relay node. The method generally includes determining, while in a connected state, that the relay UE is to enter an idle or inactive state based on one of signaling from a network entity to which the relay UE is connected or detection of a radio link failure event; and entering an idle or inactive state such that remote UEs connected with the relay UE are also transitioned from a connected state to an idle or inactive state.

Certain aspects provide a method for wireless communication by a network entity. The method generally includes determining that a remote user equipment (UE) connected to the network entity via a relay UE is to enter an idle or inactive state; transmitting, to the remote UE, signaling to trigger the remote UE to enter an idle or inactive state; and subsequent to transmitting the signaling to trigger the remote UE to enter an idle or inactive state, transmitting signaling to the relay UE to trigger the relay UE to enter an idle or inactive state.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 16 is a flow diagram illustrating example operations that may be performed by a relay UE, in accordance with certain aspects of the present disclosure.

FIG. 18 illustrates different combinations of remote UE and relay UE state, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
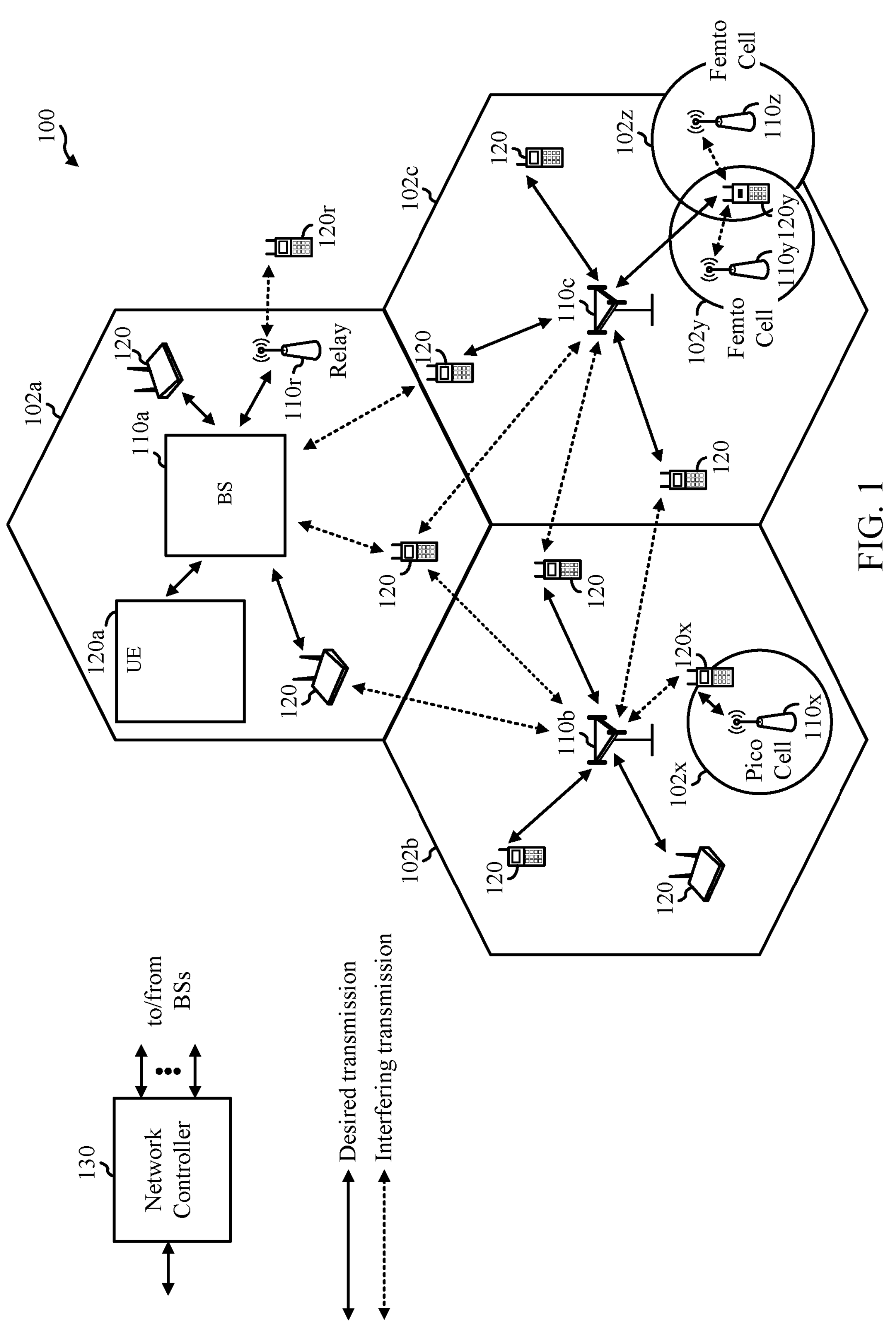
FIG. 1 is a block diagram conceptually illustrating an example telecommunications system, in accordance with certain aspects of the present disclosure.

Aspects of the present disclosure provide apparatus, methods, processing systems, and computer readable mediums for transitioning remote and relay user equipments (UEs) between idle or inactive and connected states in sidelink layer 2 (L2) relay systems.

The connection between the relay and the network entity, may be called a Uu connection or via a Uu path. The connection between the remote UE and the relay (e.g., another UE or a "relay UE"), may be called a PC5 connection or via a PC5 path. The PC5 connection is a device-to-device connection that may take advantage of the comparative proximity between the remote UE and the relay UE (e.g., when the remote UE is closer to the relay UE than to the closest base station). The relay UE may connect to an infrastructure node (e.g., gNB) via a Uu connection and relay the Uu connection to the remote UE through the PC5 connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. Cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). Cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, UEs 120*a* and/or BS 110*a* of FIG. 1 may be configured to perform operations 1100, 1200, and 1300 described below with reference to FIGS. 15, 16, and 17 to transition remote UEs and relay UEs between idle or inactive states and a connected state in sidelink layer 2 relay systems.

As illustrated in FIG. 1, the wireless communication network 100 may include a number of base stations (BSs) 110*a-z* (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

Wireless communication network 100 may also include relay UEs (e.g., relay UE 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
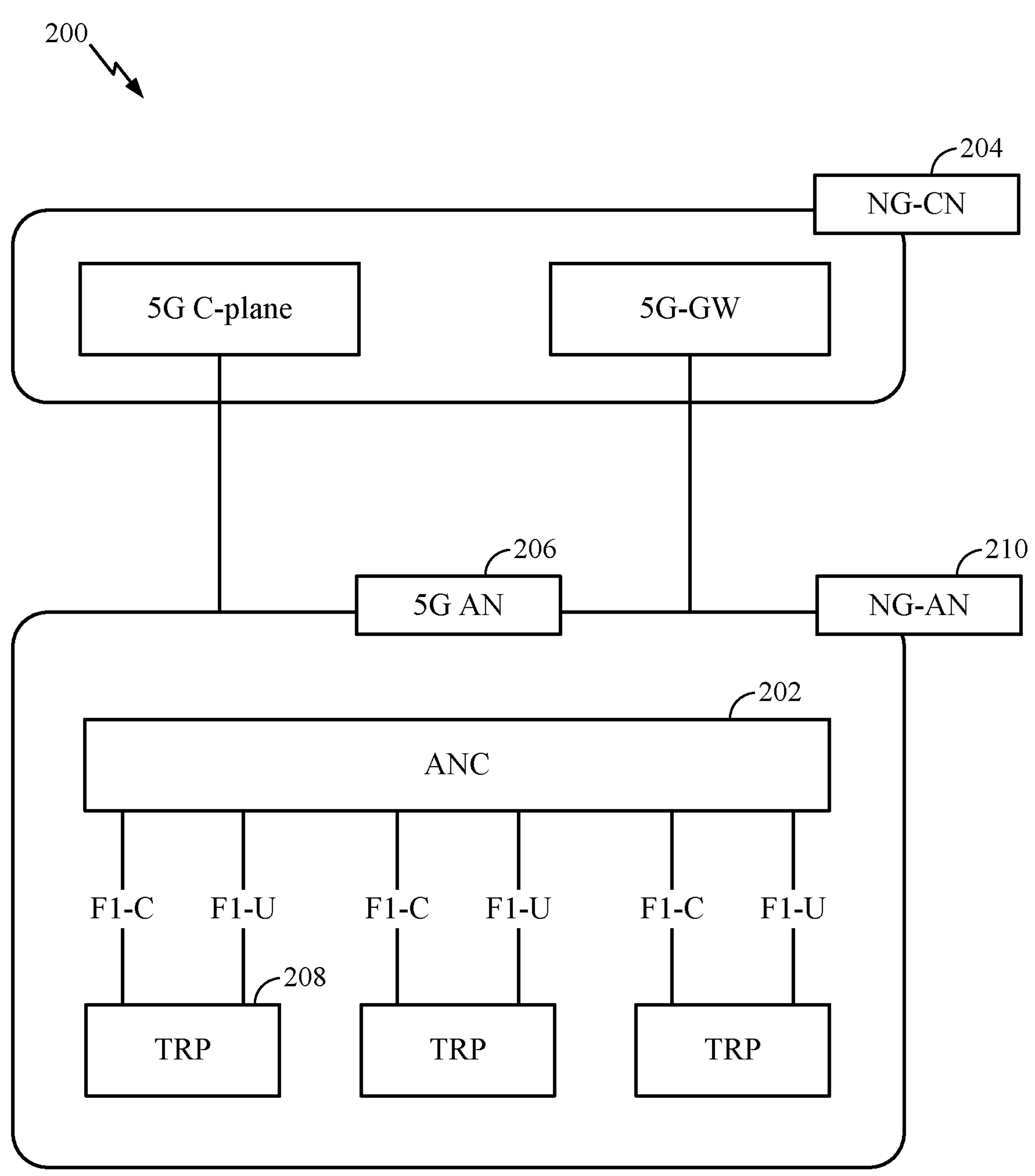
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
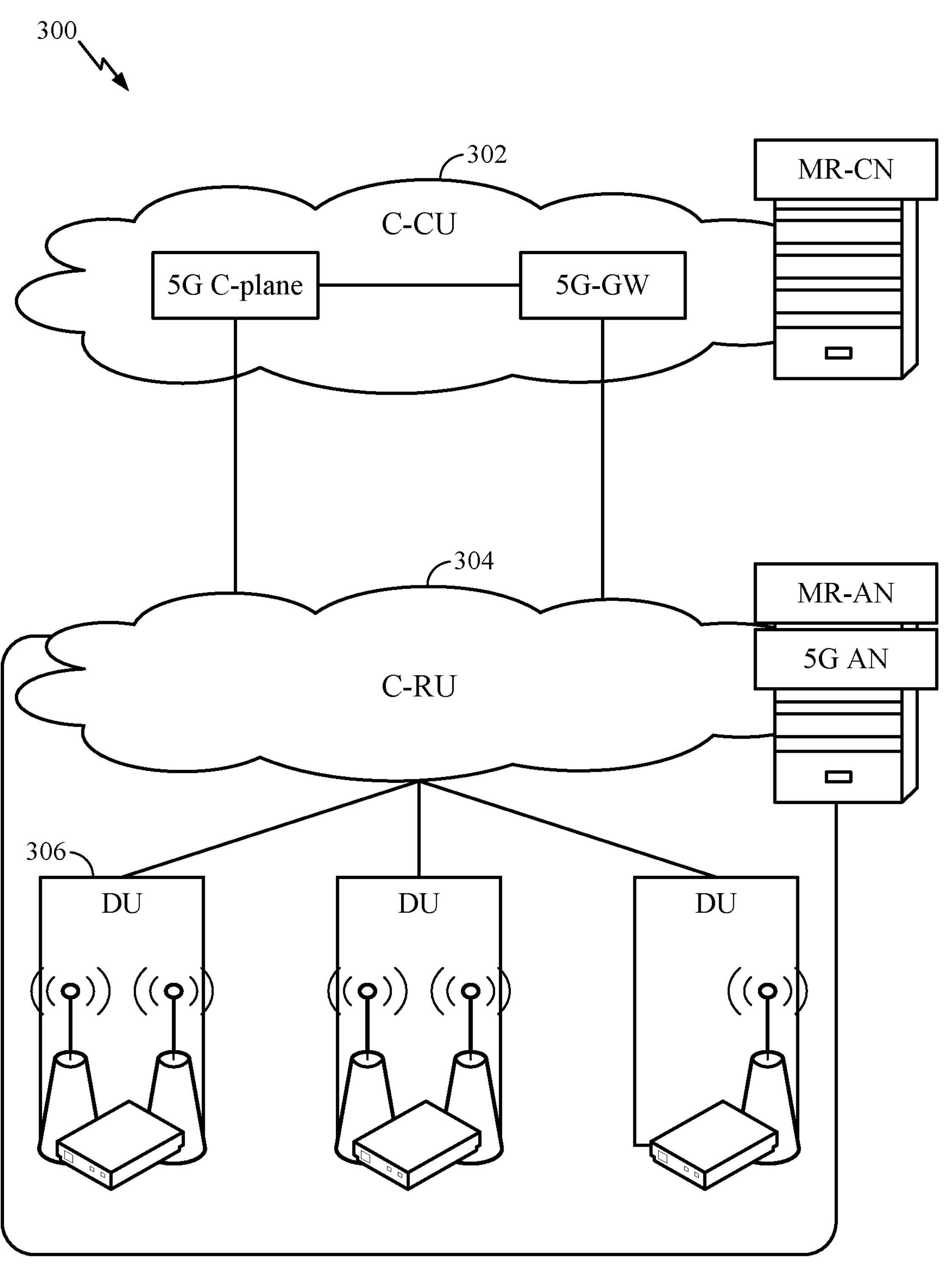
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
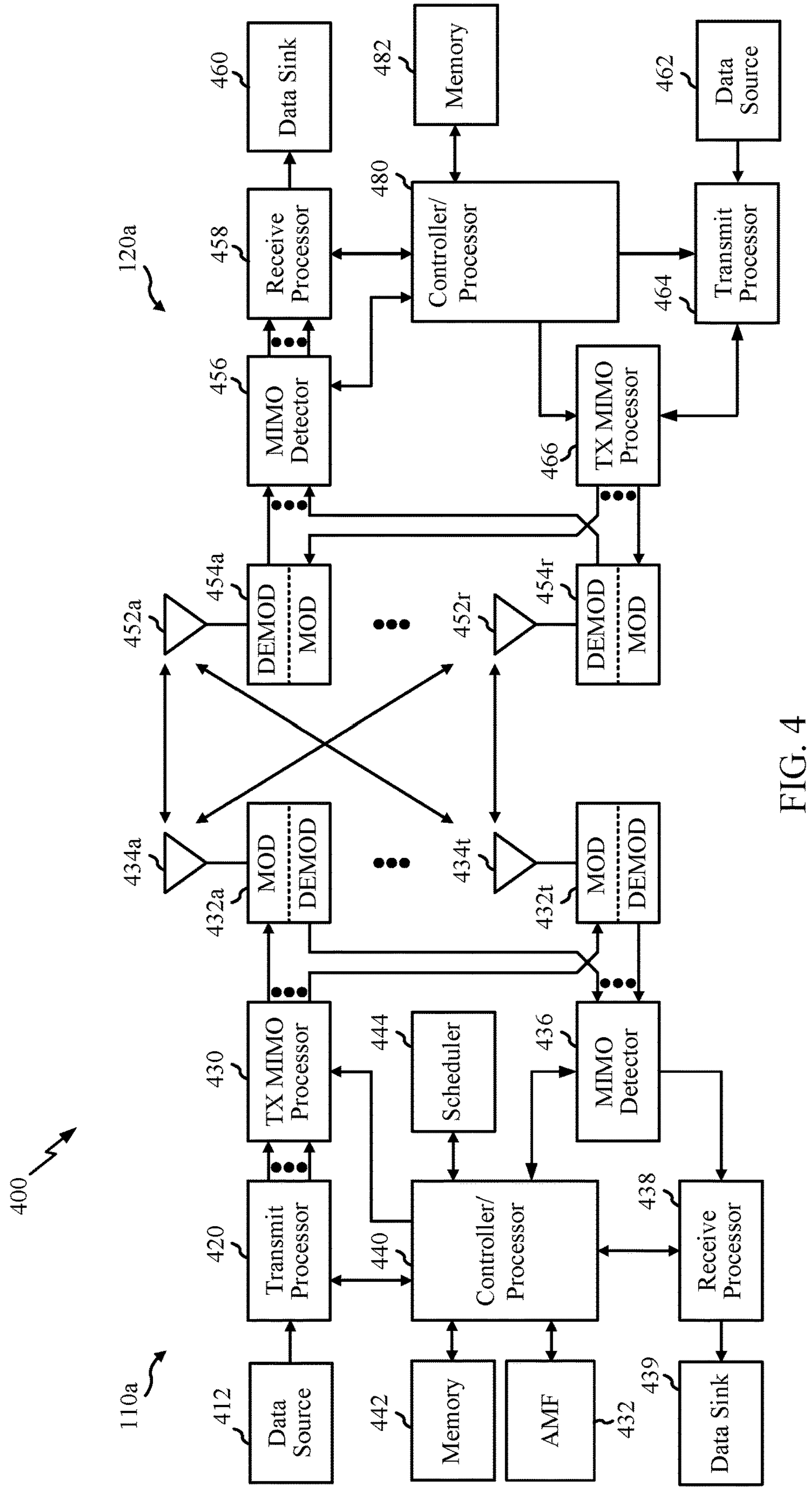
FIG. 4 is a block diagram conceptually illustrating a design of an example base station (BS) and user equipment (UE), in accordance with certain aspects of the present disclosure.

FIG. 4 illustrates example components of BS 110*a* and UE 120*a* (as depicted in FIG. 1), which may be used to implement aspects of the present disclosure. For example, antennas 452, processors 466, 458, 464, and/or controller/processor 480 of the UE 120*a* and/or antennas 434, processors 420, 430, 438, and/or controller/processor 440 of the BS 110*a* may be used to perform the various techniques and methods described herein with reference to FIGS. 15, 16, and 17.

At the BS 110*a*, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein with reference to FIGS. 15, 16, and 17.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Example UE to NW Relay

Figure 5:
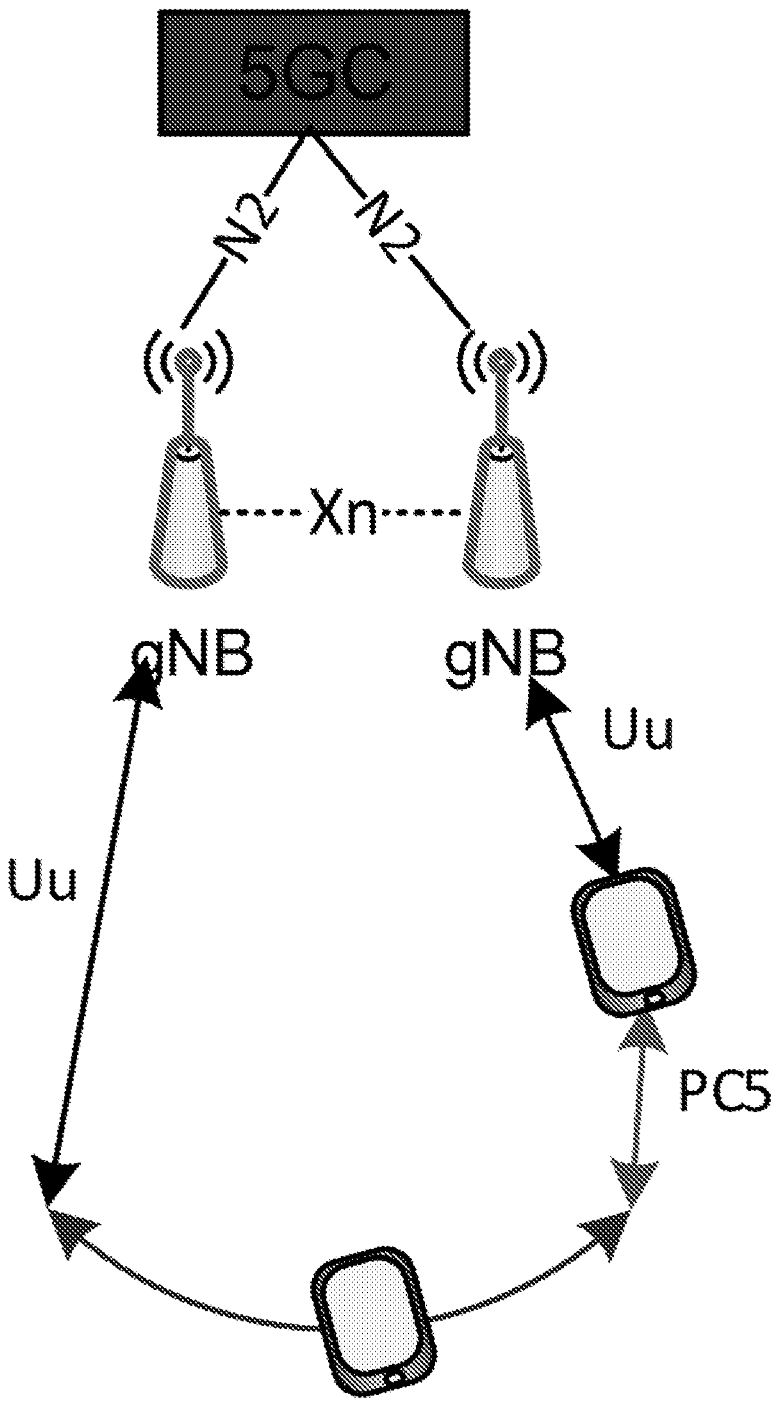
FIG. 5 is a high level path diagram illustrating example connection paths of a remote user equipment (UE), in accordance with certain aspects of the present disclosure.

Aspects of the present disclosure involves a remote UE, a relay UE, and a network, as shown in FIG. 5, which is a high level path diagram illustrating example connection paths: a Uu path (cellular link) between a relay UE and the network gNB, a PC5 path (D2D link) between the remote UE and the relay UE. The remote UE and the relay UE may be in radio resource control (RRC) connected mode.

Figure 6:
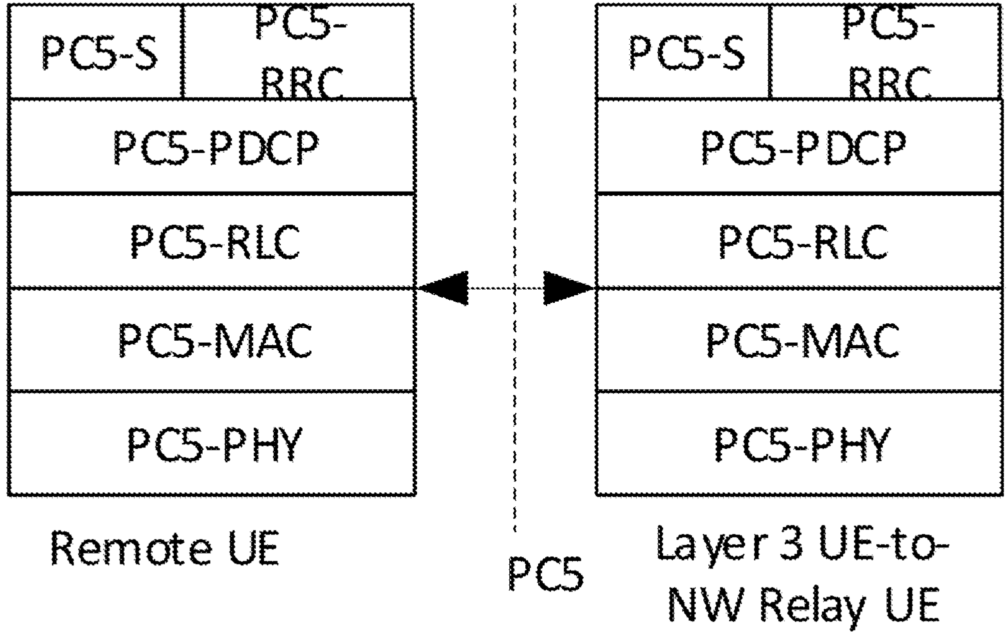
FIG. 6 is an example block diagram illustrating a control plane protocol stack on L3, when there is no direct connection path between the remote UE and the network node, in accordance with certain aspects of the present disclosure.
Figure 7:
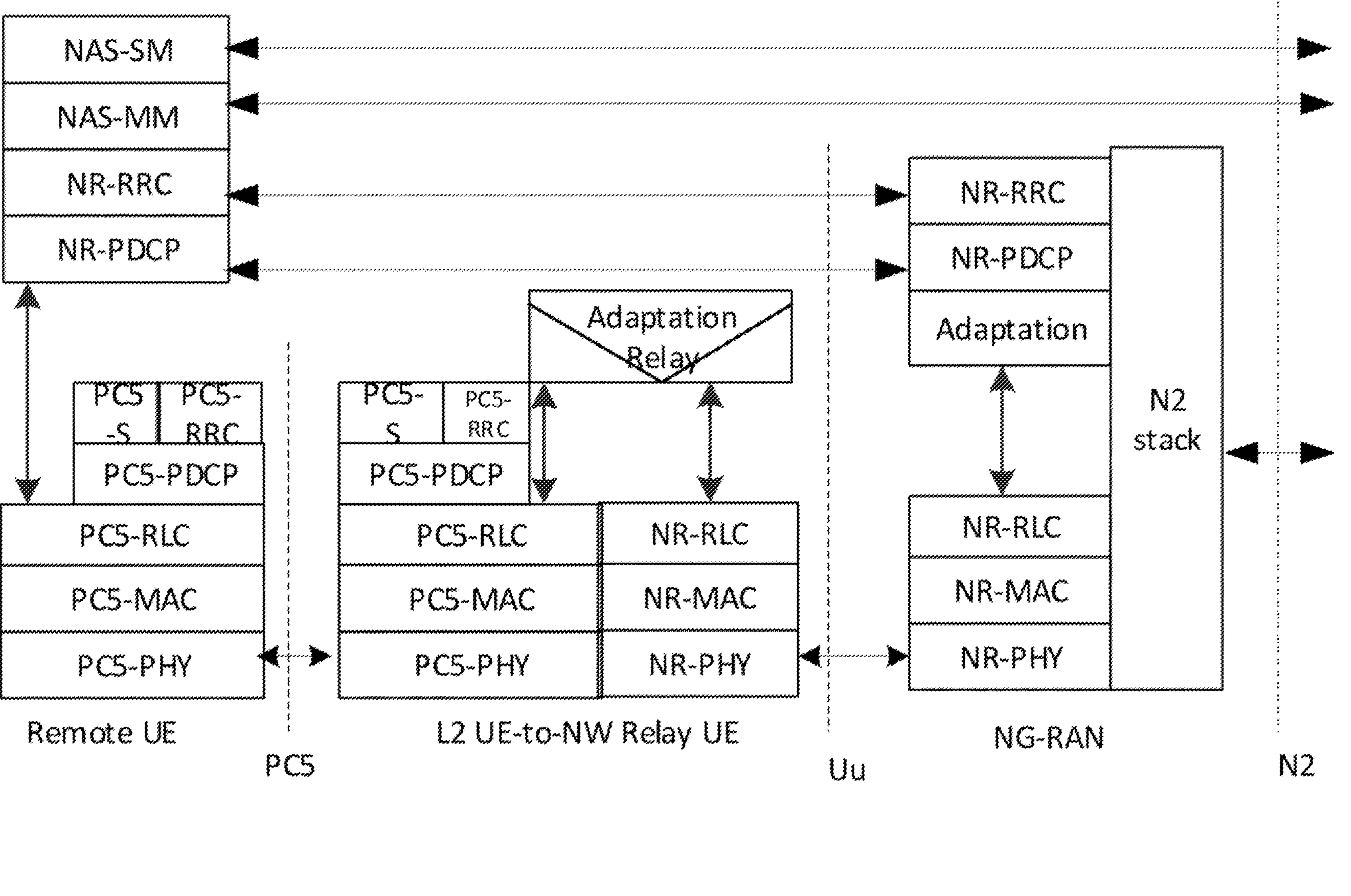
FIG. 7 is an example block diagram illustrating a control plane protocol stack on L2, when there is direct connection path between the remote UE and the network node, in accordance with certain aspects of the present disclosure.

As shown in FIG. 6 and FIG. 7, remote UE may generally connect to a relay UE via a layer 3 (L3) connection with no Uu connection with (and no visibility to) the network or via a layer 2 (L2) connection where the UE supports Uu access stratum (AS) and non-AS connections (NAS) with the network.

FIG. 6 is an example block diagram illustrating a control plane protocol stack on L3, when there is no direct connection path (Uu connection) between the remote UE and the network node. In this situation, the remote UE does not have a Uu connection with a network and is connected to the relay UE via PC5 connection only (e.g., Layer 3 UE-to-NW). The PC5 unicast link setup may, in some implementations, be needed for the relay UE to serve the remote UE. The remote UE may not have a Uu application server (AS) connection with a radio access network (RAN) over the relay path. In other cases, the remote UE may not have direct none access stratum (NAS) connection with a 5G core network (5GC). The relay UE may report to the 5GC about the remote UE's presence. Alternatively and optionally, the remote UE may be visible to the 5GC via a non-3GPP interworking function (N3IWF).

FIG. 7 is an example block diagram illustrating a control plane protocol stack on L2, when there is direct connection path between the remote UE and the network node. This control plane protocol stack refers to an L2 relay option based on NR-V2X connectivity. Both PC5 control plane (C-plane) and the NR Uu C-plane are on the remote UE, similar to what is illustrated in FIG. 6. The PC5 C-plane may set up the unicast link before relaying. The remote UE may support the NR Uu AS and NAS connections above the PC5 radio link control (RLC). The NG-RAN may control the remote UE's PC5 link via NR radio resource control (RRC). In some embodiments, an adaptation layer may be needed to support multiplexing multiple UEs traffic on the relay UE's Uu connections.

Certain systems, such as NR, may support standalone (SA) capability for sidelink-based UE-to-network and UE-to-UE relay communications, for example, utilizing layer-3 (L3) and layer-2 (L2) relays, as noted above.

Figure 8:
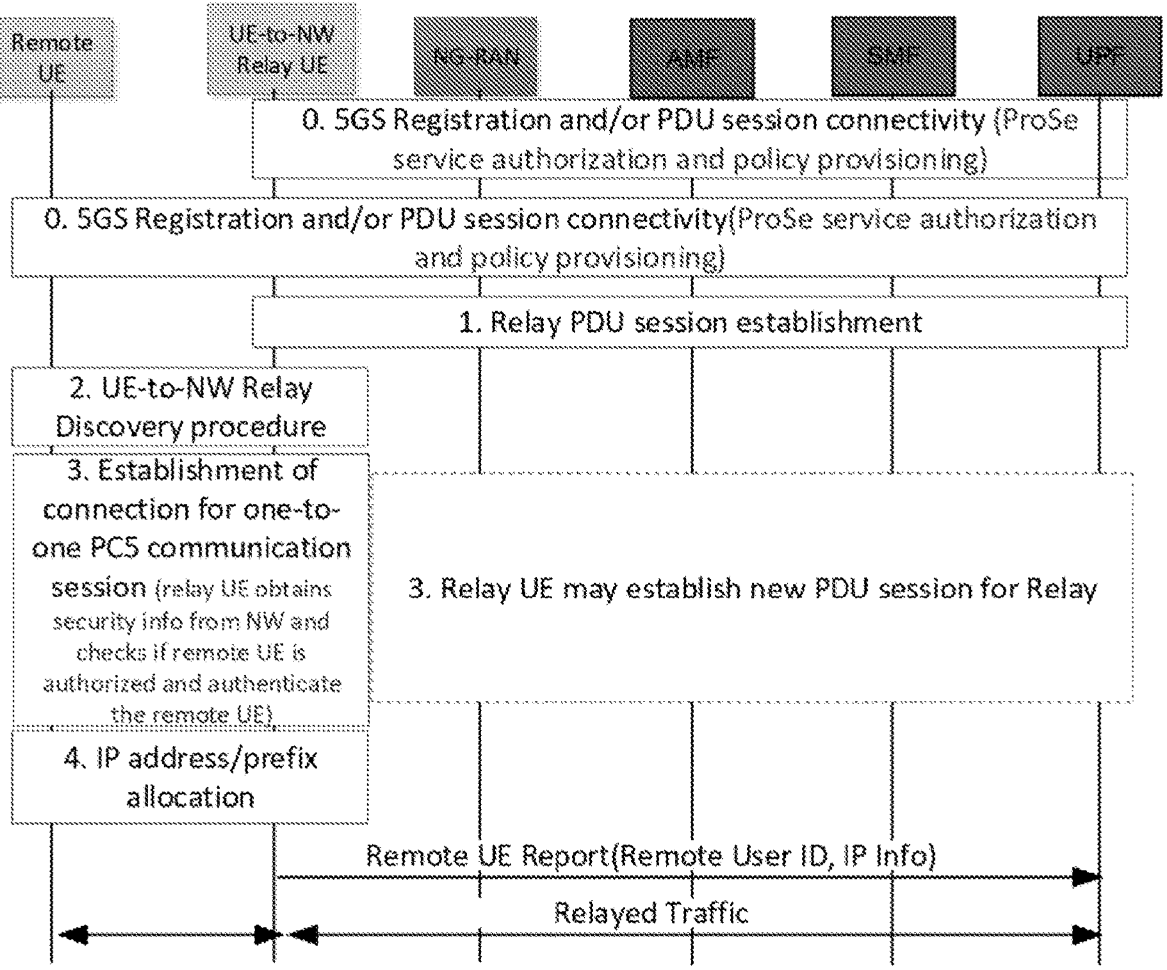
FIG. 8 illustrates example layer 3 (L3) relay procedures, in accordance with certain aspects of the present disclosure.

Particular relay procedures may depend on whether a relay is a L3 or L2 relay. FIG. 8 illustrates an example dedicated PDU session for an L3 relay. In the illustrated scenario, a remote UE establishes PC5-S unicast link setup and obtains an IP address. The PC5 unicast link AS configuration is managed using PC5-RRC. The relay UE and remote UE coordinate on the AS configuration. The relay UE may consider information from RAN to configure PC5 link. Authentication/authorization of the remote UE access to relaying may be done during PC5 link establishment. In the illustrated example, the relay UE performs L3 relaying.

Figure 9:
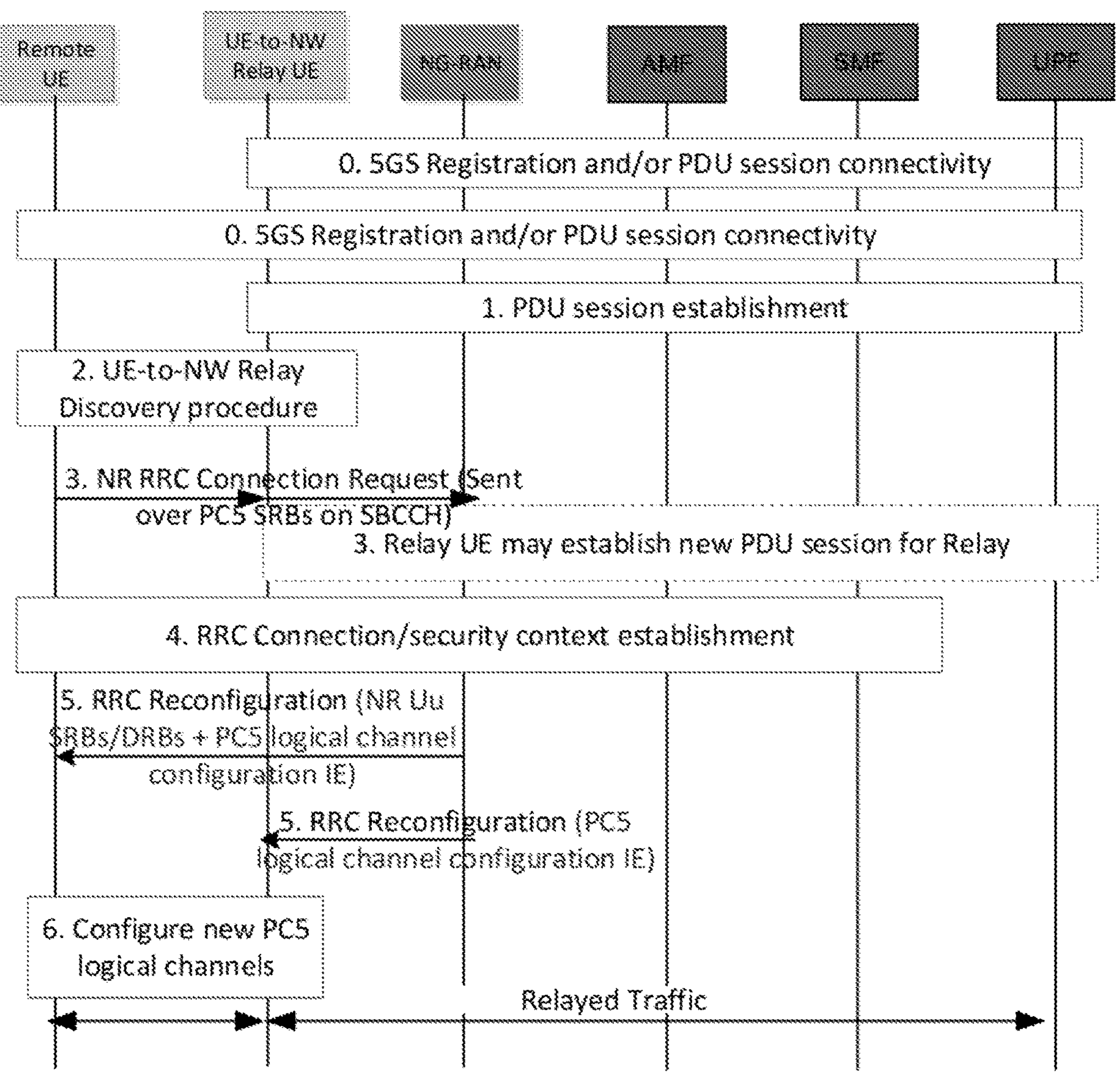
FIG. 9 illustrates example layer 2 (L2) relay procedures, in accordance with certain aspects of the present disclosure.

FIG. 9 illustrates an example dedicated PDU session for an L2 relay. In the illustrated scenario, there is no PC5 unicast link setup prior to relaying. The remote UE sends the NR RRC messages on PC5 signaling radio bearers (SRBs) over a sidelink broadcast control channel (SBCCH). The RAN can indicate the PC5 AS configuration to remote UE and relay UE independently via NR RRC messages. Changes may be made to NR V2X PC5 stack operation to support radio bearer handling in NR RRC/PDCP but support corresponding logical channels in PC5 link. In L2 relaying, PC5 RLC may need to support interacting with NR PDCP directly.

There are various issues to be addressed with sidelink relay DRX scenarios. One issue relates to support of a remote UE sidelink DRX for relay discovery. One assumption for relay discover in some cases is that the Relay UE is in CONNECTED mode only, rather than IDLE/INACTIVE. A remote UE, may be in a CONNECTED, IDLE/INACTIVE or out of coverage (OOC) modes.

Figure 10A:
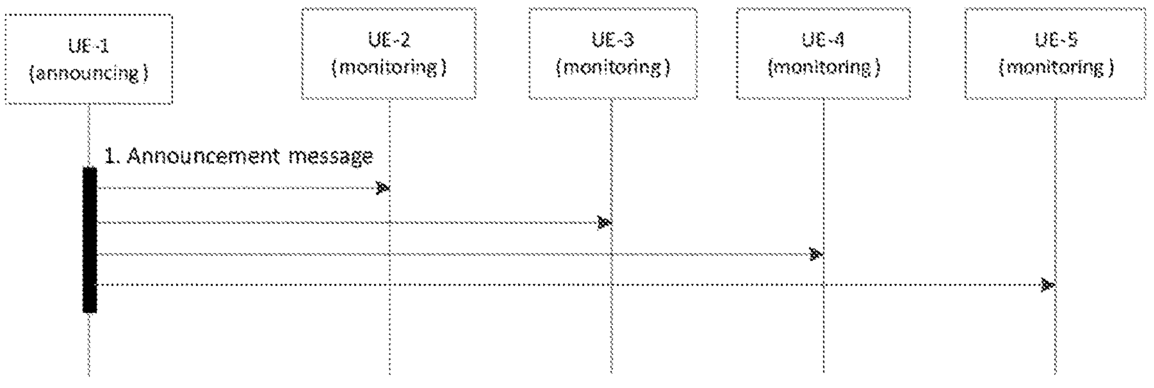
FIGS. 10A and 10B illustrate example relay discovery procedures.
Figure 10B:
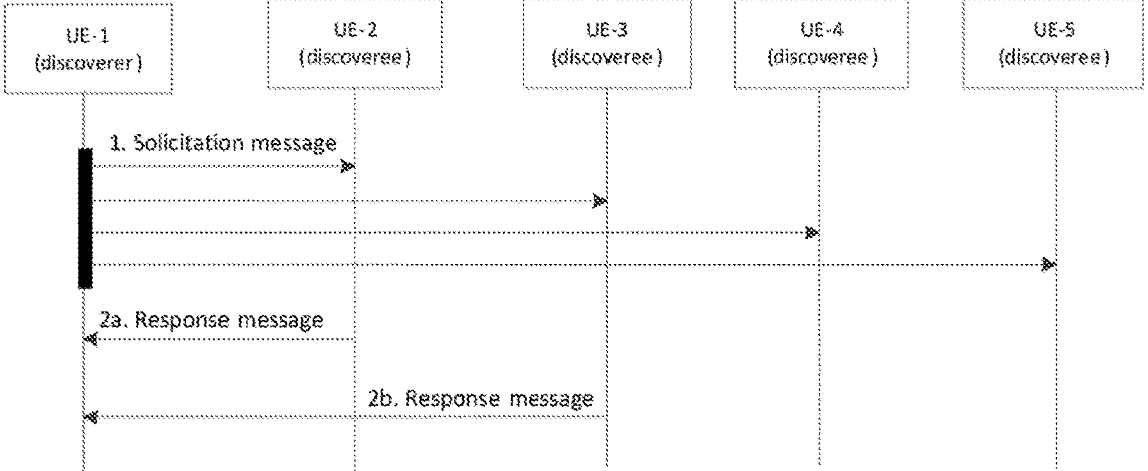

Discovery for both relay selection and reselection may be supported. Different type of discovery models may be supported. For example, a first model (referred to as Model A discovery) is shown in FIG. 10A. In this case, a UE sends discovery messages (an announcement) while other UEs monitor. According to a second model (referred to as Model B discovery) shown in FIG. 10B, a UE (discoverer) sends a solicitation message and waits for responses from monitoring UEs (discoverees). Such discovery messages may be sent on a PC5 communication channel (e.g., and not on separate discovery channel). Discovery messages may be carried within the same layer-2 frames as those used for other direct communication including, for example, the Destination Layer-2 ID that can be set to a unicast, groupcast or broadcast identifier, the Source Layer-2 ID that is always set to a unicast identifier of the transmitter, and the frame type indicates that it is a ProSe Direct Discovery message.

As noted above, for relay selection, the remote UE has not connected to any relay node (i.e. PC5 unicast link is not established between remote UE and relay node). In this case, it may be desirable to design DRX modes to reduce remote UE power consumption on monitoring relay discovery messages for relay selection.

As noted above, for relay reselection, the remote UE has connected to at least one relay node (e.g., with a PC5 unicast established between the emote UE and relay node). For relay reselection, it may be desirable to design a DRX configuration that helps reduce remote UE power consumption while monitoring for relay discovery messages for relay reselection and PC5 data transmission.

Figure 11:
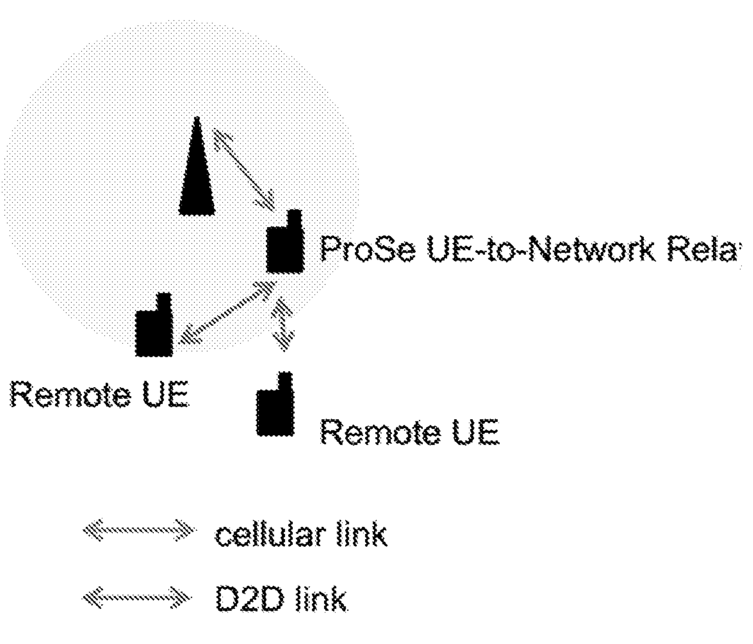
FIG. 11 illustrates an example communications environment in which a relay UE serves one or more remote UEs.

FIG. 11 illustrates an example environment in which remote UEs are served by a network entity through a UE-to-network relay (e.g., a relay UE). To communicate through a relay UE, a remote UE, which has not connected to a relay node, may discover relay nodes and select one or more of the relay nodes as the remote UE's relay. The remote UE may, for example, discover all relay nodes with a sidelink discovery reference signal received power (SD-RSRP) above a first threshold value (e.g., more than minHyst above q-Rx-LevMin). The remote UE may also reselect a relay when the remote UE is already connected with a relay node. To do so, the remote UE can determine that the sidelink RSRP (SL-RSRP) is below a second threshold value (e.g., more than minHyst below q-Rx-LevMin), and based on the determination, discover relay nodes having an SD-RSRP above the first threshold value.

Example State Transitions in Sidelink Layer 2 Relay Systems

Aspects of the present disclosure provide apparatus, methods, processing systems, and computer readable mediums for transitioning remote and relay UEs between idle or inactive and connected states in sidelink L2 relay systems. As will be described, the techniques may enable remote UEs to transition between states while connected with a relay UE using a layer 2 relay.

Figure 12A:
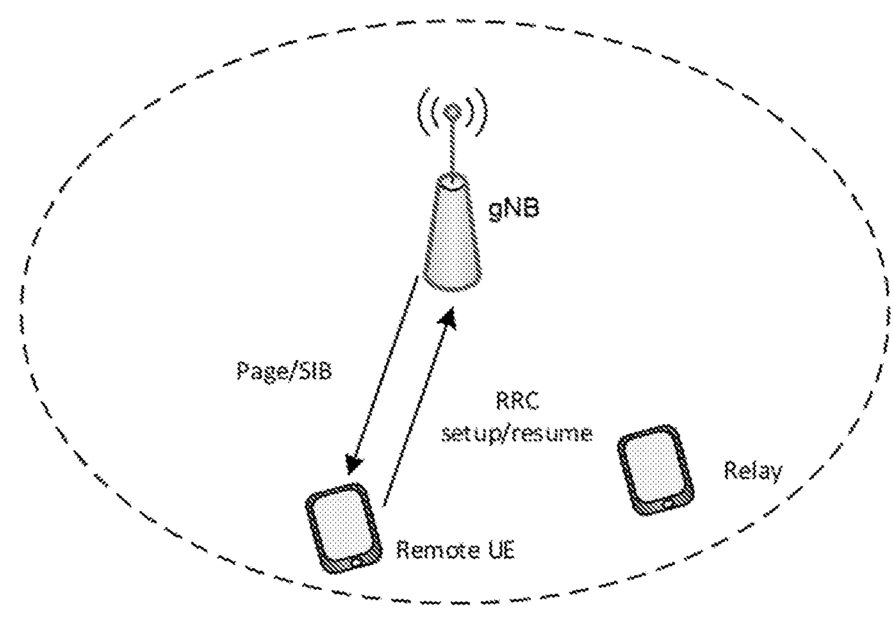
FIGS. 12A and 12B illustrate example scenarios in which a remote UE receives paging and system information blocks based on whether the remote UE is in or out of coverage of a network entity.
Figure 12B:
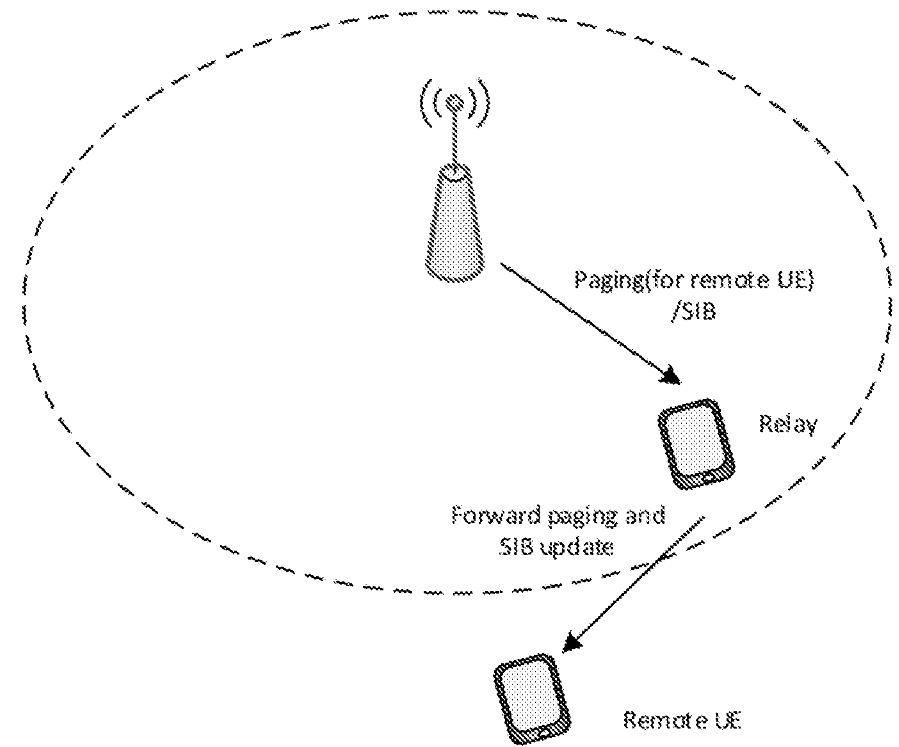

FIGS. 12A and 12B illustrate example scenarios in which a UE communicates with a network entity (e.g., a gNB). In both scenarios illustrated in FIGS. 12A and 12B, the relay UE is in coverage, and in one of an RRC Idle, Inactive, or Connected state. In the scenario illustrated in FIG. 12A, the remote UE is in coverage of the network entity. Because the remote UE is in coverage, the remote UE can receive paging and system information blocks (SIBs) directly from the network entity via the Uu link. However, in the scenario illustrated in FIG. 12B, the remote UE may be out of coverage of the network entity. Because the remote UE is out of coverage, and the relay UE is in coverage, the remote UE may connect with the relay UE and receive paging and SIBs from the network entity via the relay UE.

Figure 13:
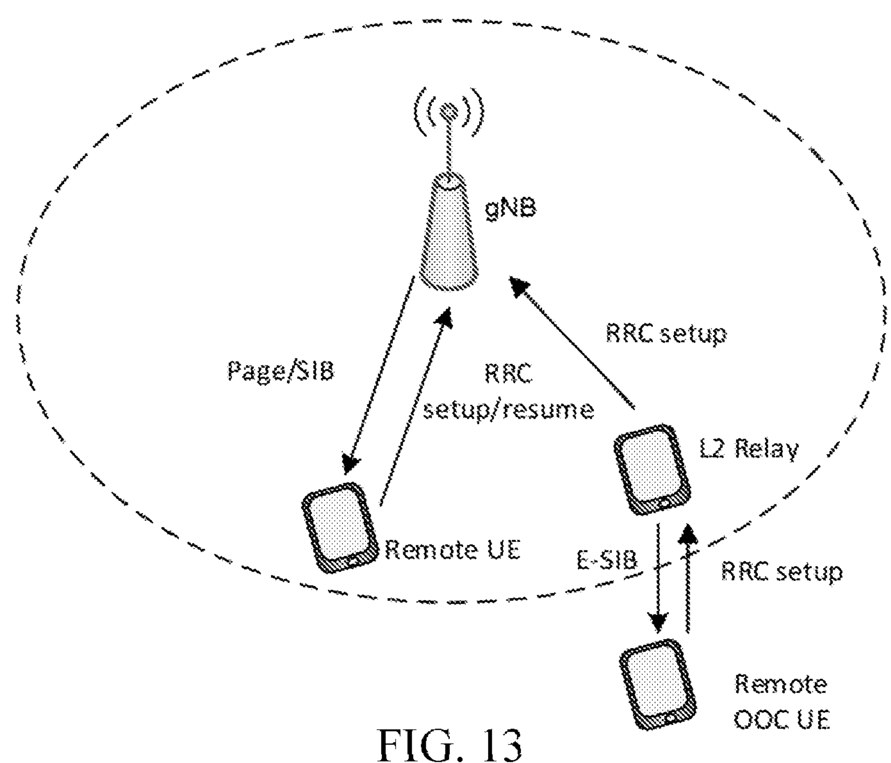
FIG. 13 illustrates example connection paths of a remote UE and paging prior to connecting with a relay.

FIG. 13 illustrates an example of paging by a remote UE prior to connecting with a relay UE. Before the remote UE connects with the relay UE, the UE may follow UE Idle or Inactive behavior as would be used were a remote UE connecting with a network entity. For example, the UE may perform idle mode measurements and cell (re)selection. Upon reception of Uu paging from a network entity, the UE can trigger unified access control (UAC) and radio resource configuration (RRC) setup or resumption, and can monitor the Uu connection for SIB updates. Remote UEs within coverage of a network entity may receive paging from the network entity; however, remote UEs outside of coverage of the network entity that are not connected with an in-coverage relay may not be able to receive paging and SIBs from the network entity.

Figure 14:
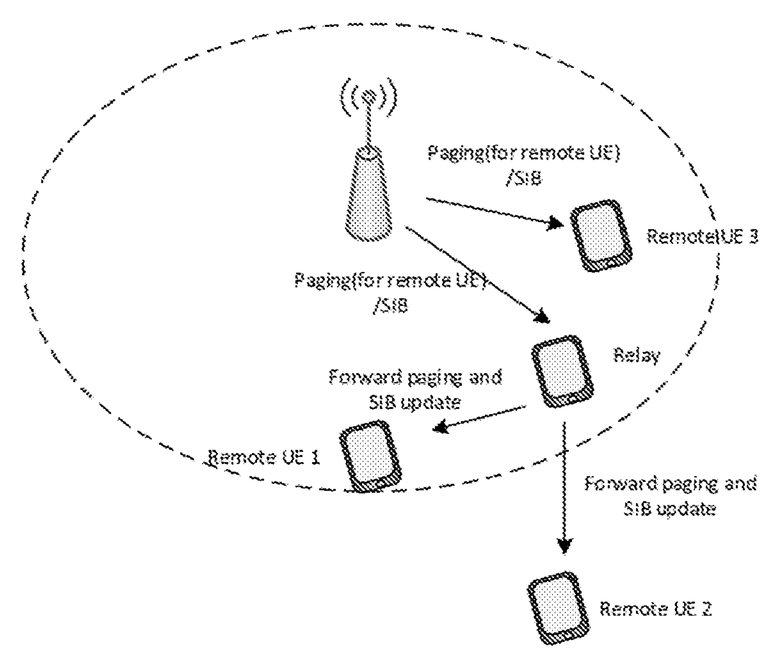
FIG. 14 illustrates example connection paths between remote UEs and relays after remote UEs connect with a relay.

FIG. 14 illustrates an example of paging by a remote UE after connecting with a relay (e.g., after a PC5 RRC connection is established). The remote UE can be configured by a gNB in one of a plurality of paging modes. In direct paging, a remote UE may monitor Uu paging and SIB updates. Direct paging may be a default mode that a remote UE applies if no signaling is received that indicates the paging mode to be used by the UE. Forward paging may allow the remote UE to forego monitoring for Uu paging or SIB updates; the relay UE, instead, monitors the remote UE's paging and forwards the remote UE's paging to the remote UE. Adaptive paging may allow for switching between direct and forward paging based on a request by the remote UE. Finally, a remote UE can be configured in a no-paging mode in which neither the remote UE nor the relay UE monitors Uu paging and/or SIB updates for the remote UE. Generally, the remote paging mode may be configured on a per-remote-UE basis, as illustrated in FIG. 14. For example, remote UE 3 may directly monitor Uu paging, while remote UEs 1 and 2, which are connected with the relay UE, may rely on paging forwarding.

Figure 15:
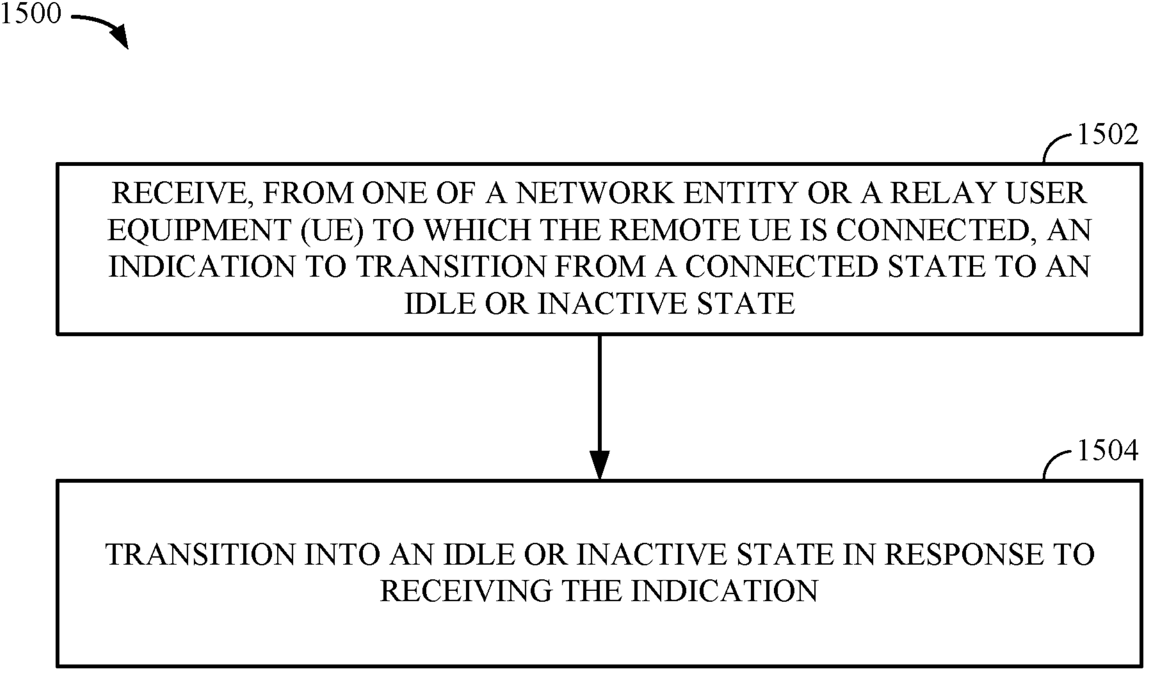
FIG. 15 is a flow diagram illustrating example operations that may be performed by a remote UE, in accordance with certain aspects of the present disclosure.
Figure 17:
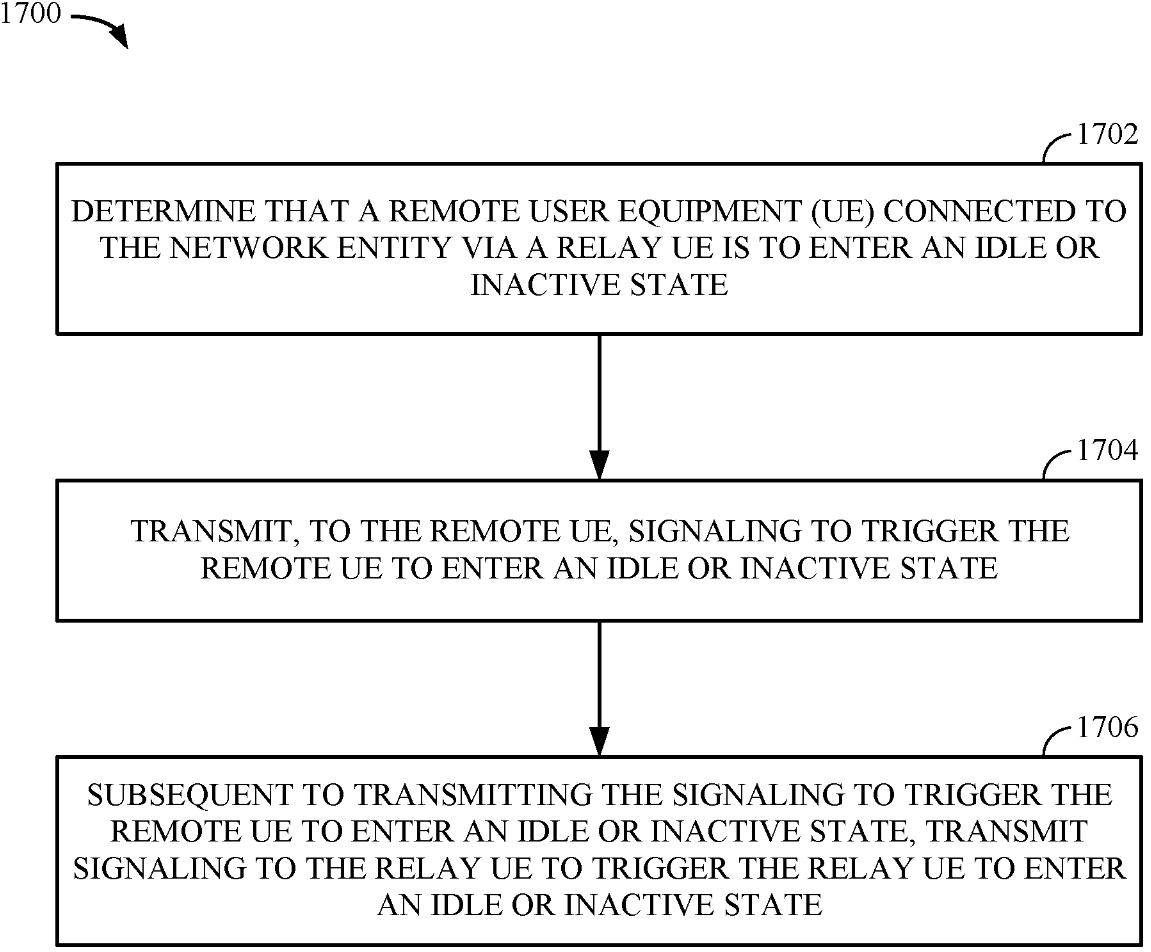
FIG. 17 is a flow diagram illustrating example operations that may be performed by a network entity, in accordance with certain aspects of the present disclosure.

Aspects of the present disclosure may allow for remote UEs to transition between idle or inactive radio resource control (RRC) states and a connected RRC state in sidelink L2 relay systems. FIGS. 15, 16, and 17 illustrate example operations from the perspective of a remote UE, relay UE, and network entity, respectively, for transitioning between idle or inactive states and connected states in sidelink L2 relay systems.

FIG. 15 illustrates example operations 1500 that may be performed by a remote UE to receive paging in a sidelink L2 relay system. As illustrated, operations 1500 begin at block 1502, where the remote UE receives, from one of a network entity or a relay user equipment (UE) to which the UE is connected, an indication to transition from a connected state to an idle or inactive state.

At block 1504, the remote UE transitions into an idle or inactive state in response to receiving the indication.

FIG. 16 illustrates example operations 1600 that may be performed by a relay UE to transition between idle or inactive states and a connected state in a sidelink L2 relay system and forward paging to a remote UE connected to the relay UE. As illustrated, operations 1600 may begin at block 1602, where the relay UE determines, while in a connected state, that the relay UE is to enter an idle or inactive state. The determination may be based on one of signaling from a network entity to which the relay UE is connected or detection of a radio link failure event.

At block 1604, the relay UE enters and idle or inactive state such that remote UEs connected with the relay UE are also transitioned from a connected state to an idle or inactive state.

FIG. 17 illustrates example operations that may be performed by a network entity to transition relay UE and remote UEs between idle or inactive states and a connected state in a sidelink L2 relay system. As illustrated, operations 1700 may begin at block 1702, where the network entity determines that a remote user equipment (UE) connected to the network entity via a relay UE is to enter an idle or inactive state.

At block 1704, the network entity transmits, to the remote UE, signaling to trigger the remote UE to enter an idle or inactive state.

At block 1706, the network entity transmits, subsequent to transmitting the signaling to trigger the remote UE to enter an idle or inactive state, signaling to the relay UE to trigger the relay UE to enter an idle or inactive state.

In some embodiments, transitioning remote UEs and relay UEs between idle or inactive and connected states may not entail signaling and procedure changes for a relay UE. The relay UE can work in any of RRC idle, RRC inactive, or RRC connected states. Further, a relay UE may perform RRC state transitions using the mechanisms provided in a legacy RRC state transition procedure.

FIG. 18 is a table showing feasible combinations of relay UE and remote UE states. Different remote UEs connected to a same relay may have different RRC states. For example, a remote UE may be in any of an RRC idle, RRC inactive, or RRC connected state. Following an RRC state transition procedure, the state of a remote UE may be managed separately from the state of a relay UE, as illustrated in FIG. 18. For example, if a remote UE is in an idle or inactive state, the relay UE may be in any of an idle, inactive, or connected state. However, if a remote UE is in a connected state, the relay may not be able to transition to or be in an idle or inactive state, as the RRC connection and bearers may be released at the relay UE when the relay UE is in an idle or inactive state, and thus the remote UE may not be able to maintain an RRC connection with the network entity if the relay UE is in an idle or inactive state.

Figure 19:
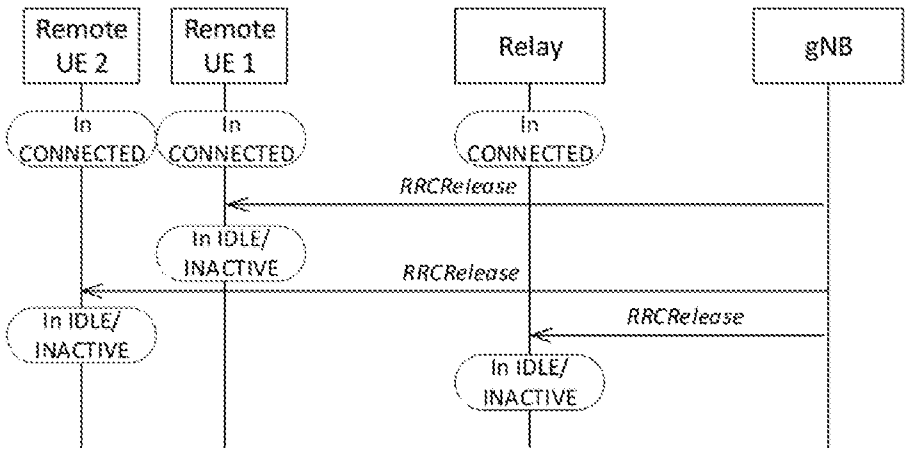
FIG. 19 is a call flow diagram illustrating example messages that may be passed between a remote UE, a relay UE, and a network entity for transitioning the remote UE from a connected state to an idle or inactive state, in accordance with certain aspects of the present disclosure.

FIG. 19 illustrates an example transition of a relay UE and remote UEs connected with the relay UE from a connected state to an idle or inactive state based on signaling from the network entity, according to some embodiments. As illustrated, to effectuate the transition of the remote UEs and the remote UE to an idle or inactive state, the network entity may transmit RRC release messages to the remote UEs to transition the remote UEs to an idle or inactive state. Once the remote UEs are transitioned to an inactive state, the relay UE to which the remote UEs were previously connected may be transitioned to an idle or inactive state via the transmission of an RRC release message to the relay UE. Subsequently, when a remote UE attempts to enter a connected state, the relay UE may transition to a connected state (as discussed in further detail below).

Figure 20:
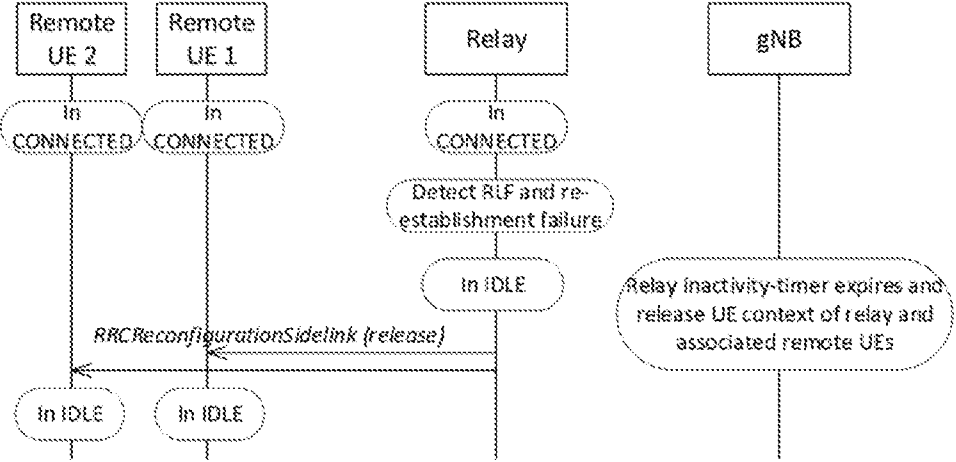
FIG. 20 is a call flow diagram illustrating example messages that may be passed between a remote UE, a relay UE, and a network UE for transitioning the remote UE from a connected state to an idle or inactive state based on a radio link failure at the relay UE, in accordance with certain aspects of the present disclosure.

FIG. 20 illustrates an example transition of a relay UE and remote UEs connected with the relay UE from a connected state to an idle or inactive state based on an autonomous transition to an idle state by the relay UE, according to some embodiments. As illustrated, FIG. 20 begins with the relay UE and each of the remote UEs connected with the relay UE in a connected state. At some point, the relay UE may autonomously transition to an idle state. For example, the relay UE may autonomously transition to an idle state based on the detection of a radio link failure (RLF) and a failure to re-establish a connection with the network entity.

After the relay UE autonomously transitions to an idle state, the relay UE reconfigures the remote UEs to cause the remote UEs to transition to an idle state. The relay UE may, for example, transmit an RRCReconfigurationSidelink message to each of the remote UEs connected with the relay UE. Upon receipt of the RRCReconfigurationSidelink message, the remote UEs may transition to an idle state.

At the network entity, an inactivity timer may expire for the connection between the relay UE and the network entity. When the inactivity timer expires, the network entity can release the context and connection for the relay UE and its associated remote UEs.

Figure 21:
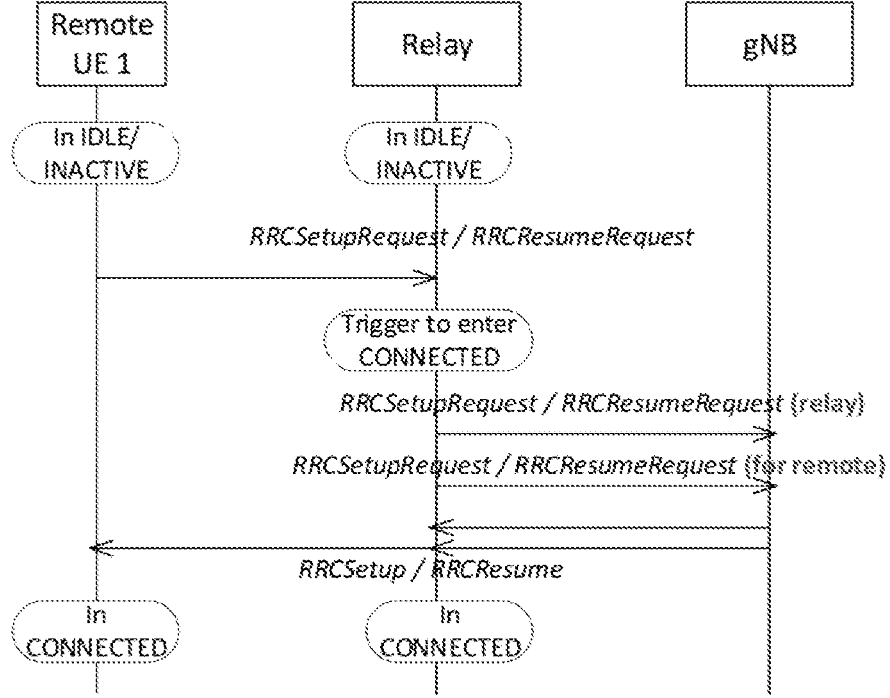
FIG. 21 is a call flow diagram illustrating example messages that may be exchanged between a remote UE, a relay UE, and a network entity for transitioning the remote UE from an idle or inactive state to a connected state, in accordance with certain aspects of the present disclosure.

FIG. 21 illustrates an example transition of a remote UE and its associated relay UE from an idle or inactive state to a connected state, according to some embodiments. As illustrated, the remote UE and relay UE may begin in an idle or inactive state, and the remote UE may transmit a request to the relay UE to setup or resume an RRC connection. The request may be, for example, an RRCSetupRequest or an RRCResumeRequest.

Receipt of the request to setup or resume the connection may trigger the relay UE to enter a connected state. To enter a connected state, the relay UE may transmit a first connection setup or resume request to the network entity to establish or reestablish a connection between the relay UE and the network entity. Subsequently, the relay UE may transmit a second connection setup or resume request to the network entity to establish or reestablish a connection between the remote UE and the network entity.

In response to receiving the first and second connection setup or resume request messages from the relay UE, the network entity establishes connections with the relay UE and remote UE and transmits a first setup or resume message to the relay UE and a second setup or resume message to the remote UE. The second setup or resume message may be transmitted to the relay UE, and the relay UE may forward the second setup or resume message to the remote UE. Based on the first and second setup or resume messages, the remote UE and the relay UE may enter a connected state, and the remote UE may subsequently perform transmissions with the network entity.

In some embodiments, to support mobility at the remote UE, the remote UE may determine whether there is a suitable relay UE available to connect with when the remote UE attempts to enter a connected state from an idle or inactive state. If the remote UE determines that no suitable relay UE exists, the remote UE can attempt to transmit a setup or resume request to the network entity with which the remote UE had previously been connected through the relay UE. The remote UE may apply a default physical (PHY) layer and/or medium access control (MAC) layer configuration when connecting with the network entity. If the remote UE attempts to transition from an inactive state and the network entity with which the UE attempts to establish a connection is the network entity with which the remote UE had previously been connected through the relay UE, no UE context retrieval process may be needed. Otherwise, if the remote UE attempts to establish a connection with a different network entity from the network entity with which the remote UE had previously been connected through the relay UE, the new network entity may perform a context retrieval process to retrieve UE context information from the network entity with which the remote UE had previously been connected through the relay UE.

When a relay UE is in an idle mode and the remote UE is in an inactive mode, the relay UE may monitor radio access network (RAN) paging and support forward paging to the remote UE. In some embodiments, a relay UE in an inactive state may be blocked from entering an idle state and performing network access stratum (NAS) recovery upon reception of core network (CN) paging.

Figure 22:
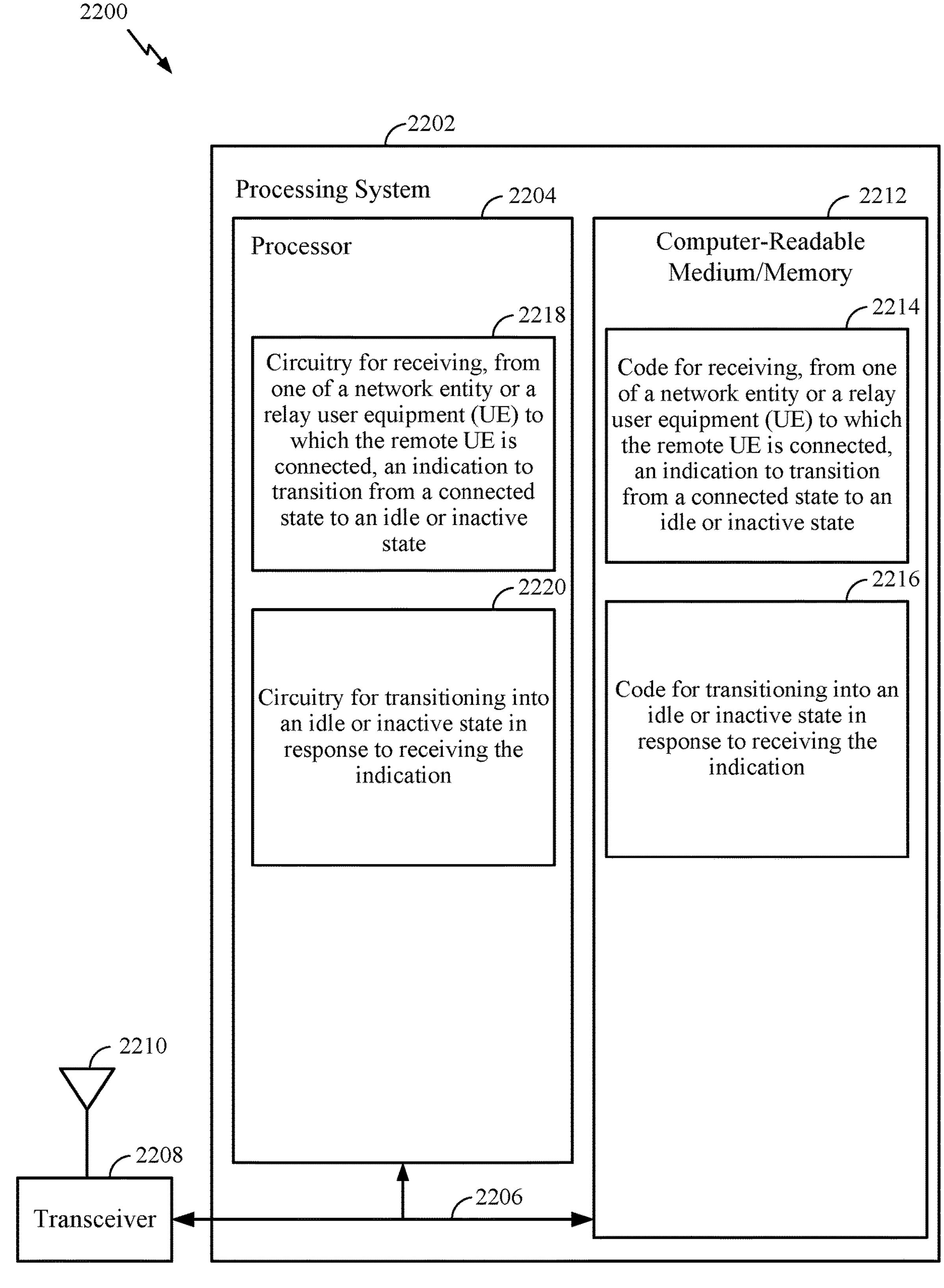
FIG. 22 illustrates a communications device that may include various components configured to perform the operations illustrated in FIG. 15, in accordance with certain aspects of the present disclosure.

FIG. 22 illustrates a communications device 2200 that may include various components (e.g., corresponding to means-plus-function components) configured to perform operations for the techniques disclosed herein, such as the operations illustrated in FIG. 15. The communications device 2200 includes a processing system 2202 coupled to a transceiver 2208. The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 15, or other operations for receiving paging in a sidelink L2 relay system. In certain aspects, computer-readable medium/memory 2212 stores code 2214 for receiving, from one of a network entity or a relay UE to which the remote UE is connected, an indication to transition from a connected state to an idle or inactive state; and code 2216 for transitioning into an idle or inactive state in response to receiving the indication. In certain aspects, the processor 2204 has circuitry configured to implement the code stored in the computer-readable medium/memory 2212. The processor 2204 includes circuitry 2218 for receiving, from one of a network entity or a relay UE to which the remote UE is connected, an indication to transition from a connected state to an idle or inactive state; and circuitry 2220 for transitioning into an idle or inactive state in response to receiving the indication.

Figure 23:
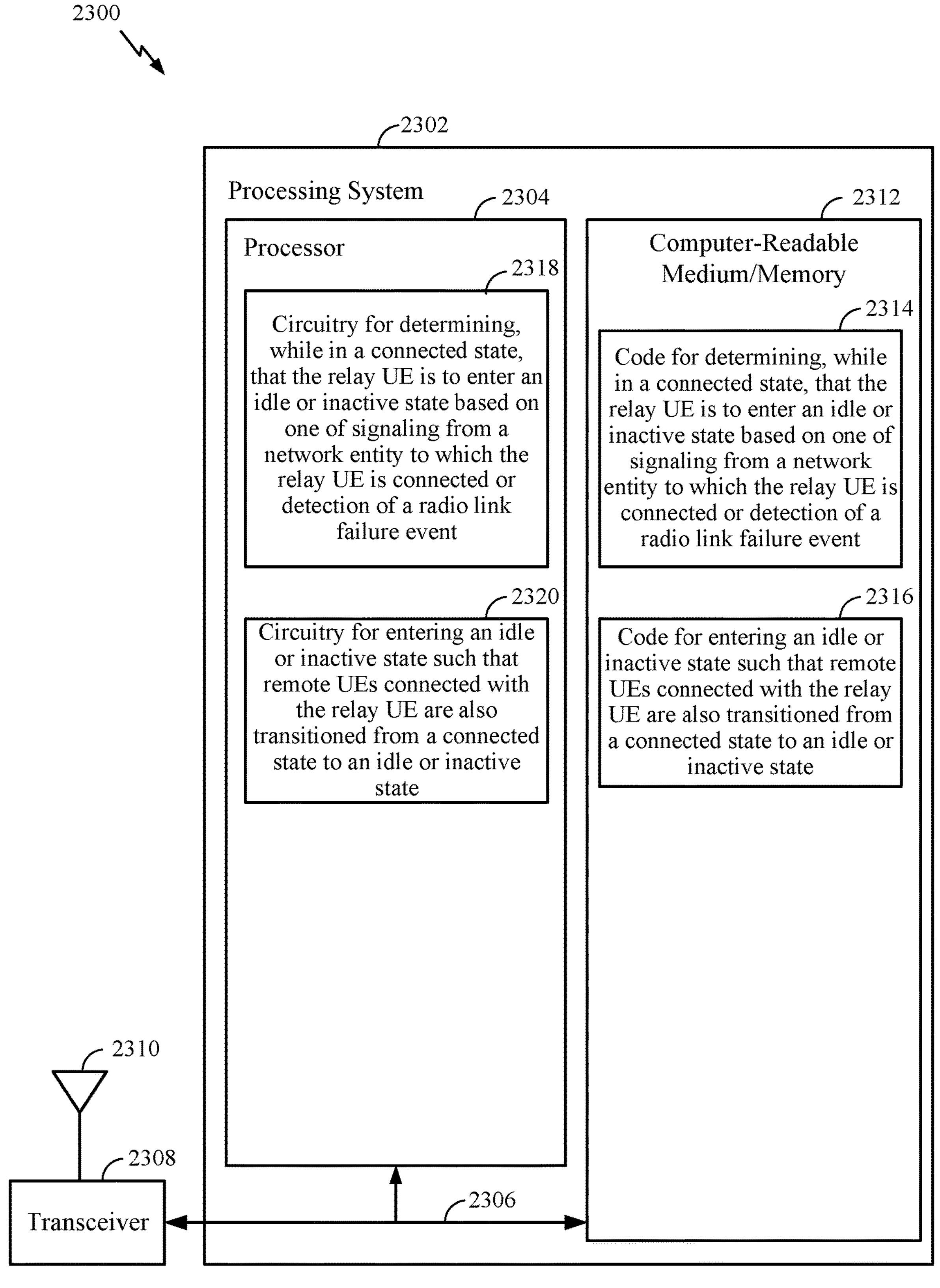
FIG. 23 illustrates a communications device that may include various components configured to perform the operations illustrated in FIG. 16, in accordance with certain aspects of the present disclosure.

FIG. 23 illustrates a communications device 2300 that may include various components (e.g., corresponding to means-plus-function components) configured to perform operations for the techniques disclosed herein, such as the operations illustrated in FIG. 16. The communications device 2300 includes a processing system 2302 coupled to a transceiver 2308. The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 16, or other operations for configuring a remote UE for paging in sidelink L2 relay scenarios and handing paged data at a relay UE in sidelink L2 relay scenarios. In certain aspects, computer-readable medium/memory 2312 stores code 2314 for determining, while in a connected state, that the relay UE is to enter an idle or inactive state based on one of signaling from a network entity to which the relay UE is connected or detection of a radio link failure event; and code 2316 for entering an idle or inactive state such that remote UEs connected with the relay UE are also transitioned from a connected state to an idle state. In certain aspects, the processor 2304 has circuitry configured to implement the code stored in the computer-readable medium/memory 2312. The processor 2304 includes circuitry 2318 for that the relay UE is to enter an idle or inactive state based on one of signaling from a network entity to which the relay UE is connected or detection of a radio link failure event; and circuitry 2324 for entering an idle or inactive state such that remote UEs connected with the relay UE are also transitioned from a connected state to an idle state.

Figure 24:
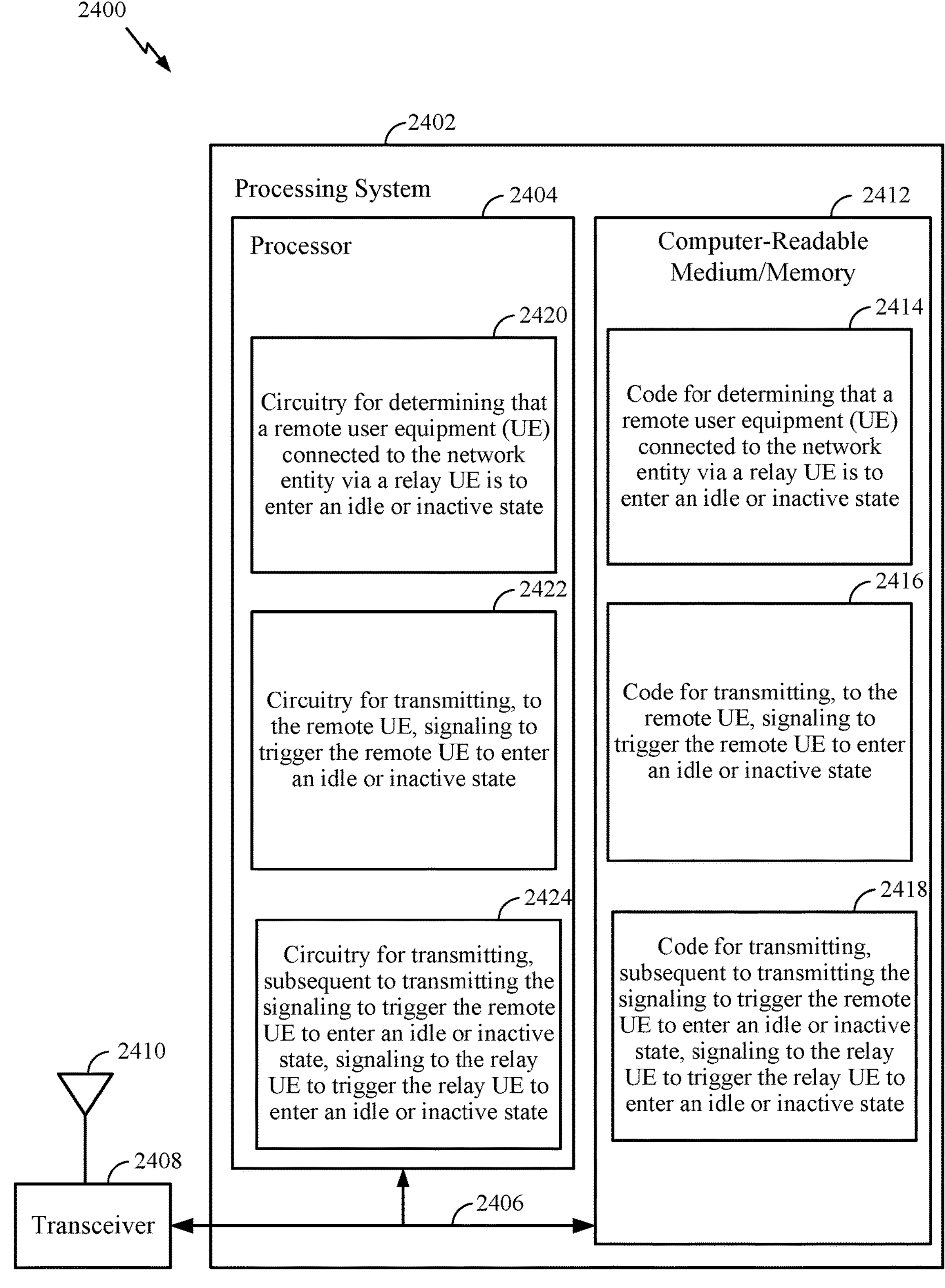
FIG. 24 illustrates a communications device that may include various components configured to perform the operations illustrated in FIG. 17, in accordance with certain aspects of the present disclosure.

FIG. 24 illustrates a communications device 2400 that may include various components (e.g., corresponding to means-plus-function components) configured to perform operations for the techniques disclosed herein, such as the operations illustrated in FIG. 17. The communications device 2400 includes a processing system 2402 coupled to a transceiver 2408. The transceiver 2408 is configured to transmit and receive signals for the communications device 2400 via an antenna 2410, such as the various signals as described herein. The processing system 2402 may be configured to perform processing functions for the communications device 2400, including processing signals received and/or to be transmitted by the communications device 2400.

The processing system 2402 includes a processor 2404 coupled to a computer-readable medium/memory 2412 via a bus 2406. In certain aspects, the computer-readable medium/memory 2412 is configured to store instructions (e.g., computer-executable code) that when executed by the processor 2404, cause the processor 2404 to perform the operations illustrated in FIG. 17, or other operations for configuring a remote UE and a remote UE for paging in a sidelink L2 relay scenario. In certain aspects, computer-readable medium/memory 2412 stores code 2414 for determining that a remote user equipment (UE) connected to the network entity via a relay UE is to enter an idle or inactive state; code 2416 for transmitting, to the remote UE, signaling to trigger the remote UEs to enter an idle or inactive state; and code 2418 for transmitting, subsequent to transmitting the signaling to trigger the remote UE to enter an idle or inactive state, signaling to the relay UE to trigger the relay UE to enter an idle or inactive state. In certain aspects, the processor 2404 has circuitry configured to implement the code stored in the computer-readable medium/memory 2412. The processor 2404 includes circuitry 2420 for determining that a remote user equipment (UE) connected to the network entity via a relay UE is to enter an idle or inactive state; circuitry 2422 for transmitting, to the remote UE, signaling to trigger the remote UEs to enter an idle or inactive state; and circuitry 2424 for transmitting, subsequent to transmitting the signaling to trigger the remote UE to enter an idle or inactive state, signaling to the relay UE to trigger the relay UE to enter an idle or inactive state.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, various operations shown in FIGS. 15, 16, and 17 may be performed by various processors shown in FIG. 4, such as processors 466, 458, 464, and/or controller/processor 480 of the UE 120*a*.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 15, 16, and 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a remote user equipment (UE), comprising:

receiving, from a relay UE to which the remote UE is connected, a sidelink radio resource control (RRC) reconfiguration message indicating to transition from a connected state to an idle or inactive state wherein the sidelink RRC reconfiguration message is received while the relay UE is in a connected state; and transitioning into the idle or inactive state in response to receiving the sidelink RRC reconfiguration message while the relay UE is in the connected state.

2. The method of claim 1, further comprising:

transmitting, to the relay UE while the remote UE is in the idle or inactive state, a request to establish or resume a connection with a network entity; and subsequent to transmitting the request, receiving a setup or resume message from the network entity via the relay UE; and entering a connected state based on receiving the setup or resume message from the network entity via the relay UE.

3. The method of claim 2, wherein the request to establish or resume connection is transmitted to the network entity via the relay UE.

4. The method of claim 1, further comprising:

attempting to enter the connected state from an idle state;

determining that no suitable relay UE exists; and transmitting, directly to a network entity, a setup or resume request message, using a default physical (PHY) layer or medium access layer (MAC) layer configuration.

5. The method of claim 1, further comprising:

monitoring for core network (CN) paging for the remote UE while in an inactive state; and determining that the relay UE is not to enter the idle state; and forwarding, to the remote UE, the CN paging for the remote UE.

6. An apparatus for wireless communications by a remote user equipment (UE), comprising:

memory comprising instructions; and one or more processors configured, individually or collectively, to execute the instructions to cause the apparatus to:

receive, from a relay UE to which the remote UE is connected, a sidelink radio resource control (RRC) reconfiguration message indicating to transition from a connected state to an idle or inactive state, wherein the sidelink RRC reconfiguration message is received while the relay UE is in a connected state; and transition into the idle or inactive state in response to receiving the sidelink RRC reconfiguration message while the UE is in the connected state.

7. A method for wireless communications by a relay user equipment (UE), comprising:

while in a connected state, determining that the relay UE is to enter an idle or inactive state based on one of signaling from a network entity to which the relay UE is connected or detection of a radio link failure event;

entering the idle or inactive state such that remote UEs connected with the relay UE are also transitioned from a connected state to an idle state prior to the relay UE being transitioned to the idle or inactive state; and transmitting sidelink radio resource control (RRC) reconfiguration messages to the remote UEs connected to the relay UE to cause the remote UEs to enter the idle or inactive state.

8. The method of claim 7, wherein the signaling comprises a radio resource control (RRC) release message received from the network entity after the RRC release messages have been transmitted to the remote UEs connected to the relay UE.

9. The method of claim 7, further comprising:

based on detecting a radio link failure event, attempting to re-establish a connection with the network entity; and determining that the attempt to re-establish the connection with the network entity has failed, wherein the sidelink RRC reconfiguration messages to the remote UEs are transmitted based on the determining that the attempt to re-establish the connection with the network entity has failed.

10. The method of claim 7, further comprising:

while in the connected state, receiving, from a remote UE in the idle or inactive state, a request to setup or resume a connection with the network entity;

transmitting, to the network entity, setup or resume requests for the remote UE; and receiving setup or resume messages for the remote UE in response to transmitting the setup or resume requests.

11. The method of claim 7, further comprising:

while in the idle or inactive state, receiving, from the remote UE in an idle or inactive state, a request to setup or resume a connection with the network entity;

transmitting, to the network entity, setup or resume requests for the relay UE and the remote UE;

receiving setup or resume messages for the relay UE and the remote UE in response to transmitting the setup or resume requests; and entering a connected state based on receiving the setup or resume messages for the relay UE and the remote UE.

12. The method of claim 11, further comprising: forwarding, to the remote UE, the setup or resume message for the remote UE, to trigger the remote UE to enter the connected state.

13. The method of claim 7, further comprising:

monitoring for radio access network (RAN) paging for the remote UE while in the idle state; and forwarding, to the remote UE, RAN paging for the remote UE.

14. An apparatus for wireless communications by a relay user equipment (UE), comprising:

memory comprising instructions; and one or more processors configured, individually or collectively, to execute the instructions to cause the apparatus to:

while in a connected state, determine that the relay UE is to enter an idle or inactive state based on one of signaling from a network entity to which the relay UE is connected or detection of a radio link failure event; and enter the idle or inactive state such that remote UEs connected with the relay UE are also transitioned from a connected state to an idle state prior to the relay UE being transitioned to the idle or inactive state; and transmit sidelink radio resource control (RRC) reconfiguration messages to the remote UEs connected to the relay UE to cause the remote UEs to enter the idle or inactive state.

15. A method for wireless communications by a network entity, comprising:

determining that a remote user equipment (UE) connected to the network entity via a relay UE is to enter an idle or inactive state;

transmitting, to the remote UE, signaling to trigger the remote UE to enter the idle or inactive state; and subsequent to transmitting the signaling to trigger the remote UE to enter the idle or inactive state, transmitting signaling to the relay UE to trigger the relay UE to enter the idle or inactive state.

16. The method of claim 15, further comprising:

receiving, from the relay UE, a first request to setup or resume a connection between the relay UE and the network entity;

receiving, from the relay UE, a second request to setup or resume a connection between the network entity and the remote UE;

transmitting, to the relay UE, a first setup or resume message to establish a connection between the relay UE and the network entity in response to the first request; and transmitting, to the relay UE for forwarding to the remote UE, a second setup or resume message to establish a connection between the remote UE and the network entity in response to the first request.

17. The method of claim 15, further comprising:

receiving, from a second remote UE which was not previously connected with the network entity through the relay UE, a request to establish or resume a connection between the second remote UE and the network entity; and performing a context retrieval process with a second network entity for the second remote UE, wherein the second network entity comprises a network entity to which the second UE was previously connected.

18. An apparatus for wireless communications by a network entity, comprising:

memory comprising instructions; and one or more processors configured, individually or collectively, to execute the instructions to cause the apparatus to:

determine that a remote user equipment (UE) connected to the network entity via a relay UE is to enter an idle or inactive state;

transmit, to the remote UE, signaling to trigger the remote UE to enter the idle or inactive state; and subsequent to transmitting the signaling to trigger the remote UE to enter an idle or inactive state, transmit signaling to the relay UE to trigger the relay UE to enter an idle or inactive state.

* * * * *